(12) United States Patent
Way et al.

(10) Patent No.: US 7,971,889 B2
(45) Date of Patent: Jul. 5, 2011

(54) LOADING MACHINE

(75) Inventors: Richard Francis Way, Stafford (GB); Mark Alan Carson, Birchover (GB)

(73) Assignee: J. C. Bamford Excavators Limited, Uttoxeter (GB)

( * ) Notice: Subject to any disclaimer, the term of this patent is extended or adjusted under 35 U.S.C. 154(b) by 741 days.

(21) Appl. No.: 11/765,362

(22) Filed: Jun. 19, 2007

(65) Prior Publication Data

US 2007/0289171 A1   Dec. 20, 2007

(30) Foreign Application Priority Data

Jun. 20, 2006   (GB) .................................. 0612152.9

(51) Int. Cl.
*E01H 5/04* (2006.01)
(52) U.S. Cl. ............ 280/124.157; 280/124.159; 37/231; 180/197
(58) Field of Classification Search ........... 280/124.157, 280/124.159; 37/231; 180/197
See application file for complete search history.

(56) References Cited

U.S. PATENT DOCUMENTS

| | | | |
|---|---|---|---|
| 4,289,442 A | 9/1981 | Stevens | |
| 5,489,007 A | 2/1996 | Yesel | |
| 5,855,379 A * | 1/1999 | Buma et al. | 280/5.514 |
| 5,865,512 A | 2/1999 | Meiser et al. | |
| 6,047,791 A | 4/2000 | Hoebelheinrich | |
| 6,099,090 A | 8/2000 | Paggi et al. | |
| 6,631,320 B1 | 10/2003 | Holt et al. | |
| 6,752,403 B2 * | 6/2004 | Allen et al. | 280/6.157 |
| 2004/0055802 A1 * | 3/2004 | Pillar et al. | 180/170 |

(Continued)

FOREIGN PATENT DOCUMENTS

DE   2 128 073 A1   12/1972

(Continued)

OTHER PUBLICATIONS

Great Britain Search Report under Section 17 for GB 0612152.9, dated Oct. 5, 2006.

(Continued)

*Primary Examiner* — Joanne Silbermann
*Assistant Examiner* — Jacob Knutson
(74) *Attorney, Agent, or Firm* — Marshall, Gerstein & Borun LLP

(57) ABSTRACT

A wheeled loading machine includes a body mounting a loading arm, a ground engaging structure including a front axle which carries a front pair of ground engaging wheels and a rear axle which carries a rear pair of ground engaging wheels, the loading arm being mounted at a position towards a rear of the machine for up and down movement about a generally horizontal axis, and the loading arm extending forwardly beside a cab which is mounted at one side of the body, to an outermost end which is beyond a front of the body, and the loading arm having at its outermost end a mounting for a loading implement and the arm being extendible to vary the length of the loading arm, and each axle being suspended from the body by a respective suspension, each of the ground engaging wheels being drivable by an engine of the machine through a mechanical transmission, and the machine including a braking system for braking each wheel, the braking system including a brake control system which provides a brake anti-locking function to resist any braked ground engaging wheel skidding relative to the ground as a result of becoming locked during braking when a low friction condition exists between the wheel and the ground.

19 Claims, 2 Drawing Sheets

U.S. PATENT DOCUMENTS

| | | |
|---|---|---|
| 2005/0062239 A1* | 3/2005 | Shore .................... 280/6.157 |
| 2005/0155993 A1* | 7/2005 | Bieker .................... 222/610 |
| 2005/0217261 A1 | 10/2005 | Hofer |
| 2007/0187207 A1 | 8/2007 | Hofer |
| 2007/0205660 A1* | 9/2007 | Carswell .................... 303/139 |

FOREIGN PATENT DOCUMENTS

| | | |
|---|---|---|
| DE | 197 38 930 A1 | 3/1998 |
| EP | 0 346 292 A1 | 2/1989 |
| EP | 0 646 509 A1 | 9/1994 |
| EP | 1 093 986 A2 | 4/2001 |
| EP | 1 123 894 A2 | 8/2001 |
| EP | 1 123 894 A8 | 8/2001 |
| EP | 1 258 406 A2 | 11/2002 |
| EP | 1 366 970 A2 | 12/2003 |
| EP | 1 582 389 A2 | 10/2005 |
| GB | 2 251 278 A | 1/1992 |
| JP | 2006-044877 A | 2/2006 |
| WO | WO-98/01331 | 1/1998 |
| WO | WO-98/41429 | 9/1998 |

OTHER PUBLICATIONS

Search Report for Application No. GB0619129.0, dated Jan. 26, 2007.

Extended European Search Report for EP 07 01 1815, dated Apr. 23, 2008.

* cited by examiner

LOADING MACHINE

BACKGROUND TO THE INVENTION

This invention relates to a loading machine for performing loading operations and more particularly to a loading machine having a loading arm mounted at a position towards a rear of the machine and which extends forwardly.

Such machines conventionally may only be driven over the ground at relatively slow speeds, for example around 30 km per hour. Whereas this speed is adequate when such a machine is performing loading operations, it is overly slow for road travel, for example for moving the machine from one location to another. Accordingly it is usual to transport such machines on a loader vehicle between work locations.

It is increasingly becoming a requirement for such loading machines to be able to travel over the ground at greater speeds, which requires the provision of a suspension to facilitate high speed travel, and more efficient braking systems than slower machines.

SUMMARY OF THE INVENTION

According to a first aspect of the invention we provide a wheeled loading machine. The machine includes a body mounting a loading arm, a ground engaging structure including a front axle which carries a front pair of ground engaging wheels and a rear axle which carries a rear pair of ground engaging wheels. The loading arm is mounted at a position towards a rear of the machine for up and down movement about a generally horizontal axis, and the loading arm extends forwardly beside a cab which is mounted at one side of the body, to an outermost end which is beyond a front of the body. The loading arm has at its outermost end a mounting for a loading implement and the arm is extendible to vary the length of the loading arm. Each axle is suspended from the body by a respective suspension, each of the ground engaging wheels being drivable by an engine of the machine through a mechanical transmission. The machine includes a braking system for braking each wheel, the braking system including a brake control system which provides a brake anti-locking function to resist any braked ground engaging wheel skidding relative to the ground as a result of becoming locked during braking when a low friction condition exists between the wheel and the ground.

A loading machine in accordance with the invention may by virtue of the suspension and four wheel anti-locking brakes, safely travel at high speeds over the ground reducing the requirement for transporting the machine between work locations.

The suspension suspending each of the front and rear axles, desirably is a non-reactive in that the vertical load on the respective wheels carried by the axle, and hence the traction between the wheels and the ground, does not significantly vary in response to changes in the driving torque applied to the wheels through the transmission. In one example of a non-reactive suspension, the suspension includes for at least one of the front and rear axles at each side of the machine, a pair of links, one link of each pair being above the other relative to the ground, the links each pair being pivotally connected at their one ends to relative to the body and at their other ends to the respective axle.

Moreover, desirably, the suspension includes for the at least one axle, damping struts to damp axle movements, the struts being provided between the axle and the body.

Each braking device is preferably operated by hydraulic fluid pressure.

The braking devices for applying braking to each of the wheels, may be operated to apply the brake by hydraulic fluid pressurised by an air-hydraulic actuator.

Thus the machine may include an air system which includes the air-hydraulic actuator.

Preferably the brake control system includes for each wheel, a wheel speed sensor, the brake control system also including a controller responsive to wheel speed signals from each of the wheel speed sensors, and operative to determine whether any braked wheel is skidding relative to the ground as a result of becoming locked during braking, and in the event that a skidding condition is determined, the controller modulating the hydraulic fluid pressure provided to apply braking to at least the skidding wheel.

For example, the controller may modulate the hydraulic pressure provided to apply braking by cycling the pressure between a pressure reduction phase and a pressure increase phase, although a cycle may also include a pressure hold phase between the pressure reduction and the pressure increase phases.

Although the controller may modulate the hydraulic fluid pressure provided to apply braking to the at least one skidding wheel only, preferably the controller modulates the hydraulic fluid pressure provided to apply braking to both wheels of the front and/or the rear axle where any or both wheels are determined to be skidding relative to the ground during braking as a result of becoming locked.

Preferably the hydraulic fluid pressure is modulated by modulating air pressure supplied to the air-hydraulic actuator.

Desirably, to aid stability when the machine is performing loading operations, the body includes, at the rear end, a counterweight at a low position, which counterweight extends rearwardly of the body beyond the horizontal axis about which the loading arm is moveable. The loading arm may be mounted at a relatively high position. For example, the horizontal axis about which the loading arm is moveable may be located in a generally horizontal plane which contains or is spaced above or at least close to an upper level of the operator's cab. However, a lower mounting position may be provided if required.

Whereas the engine could be mounted by the body at a side of the body opposite to the position of the cab, preferably the engine is mounted by the body above the rear axle and below a rear portion of the loading arm, so as to provide some counterweighting during loading operations, and to minimise the body width.

When a loading implement is mounted at the outermost end of the loading arm, the loading implement may be a loading device such as a pair of forks, provided on a carriage which is mounted to the loading arm mounting. The carriage may include at least one wheel, which when the loading arm is in a lowered position, engages the ground. Particularly where the loading arm is extended to a great extent and the arm is in a lowered position, where maximum machine overturning forces are experienced, the provision of the at least one wheel on the carriage may enable the counterweight to be reduced, enabling the machine to be made lighter than otherwise, thereby enabling the machine to travel faster than a comparable machine without this carriage wheel feature.

BRIEF DESCRIPTION OF THE DRAWINGS

Embodiments of the invention will now be described with the aid of the accompanying drawings in which:—

FIG. 1a is an illustrative side view of part of the machine of FIG. 1 showing a non-reactive suspension;

DETAILED DESCRIPTION OF THE PREFERRED EMBODIMENT

Figure 1:
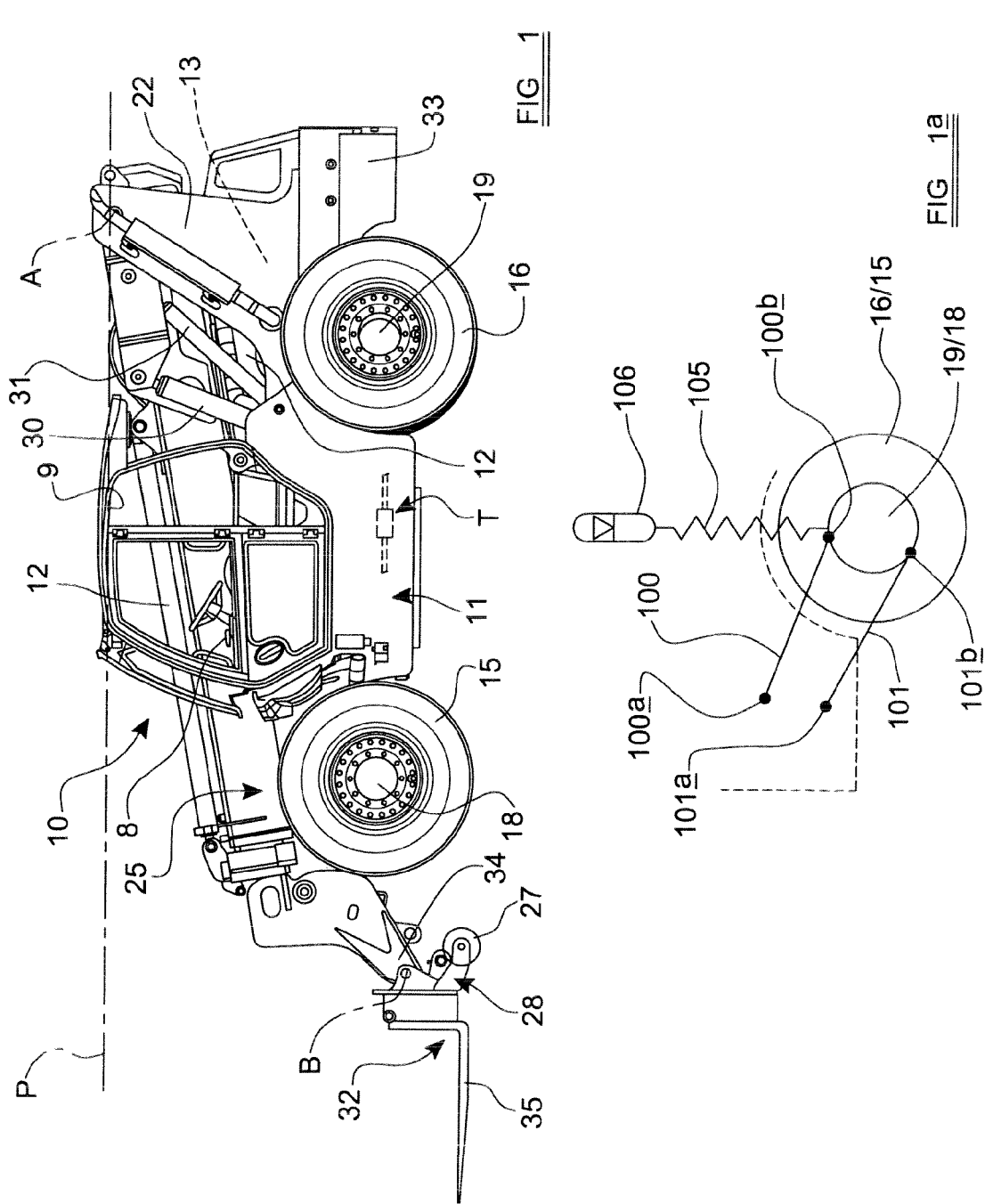
FIG. 1 is a side illustrative view of a loading machine in accordance with the present invention.

Referring to the drawings there is shown a loading machine 10 which includes a body 11 including a housing 12 for an engine which provides power for the machine 10. The position of the engine is indicated at 13 The machine 10 further includes a ground engaging structure including a front pair of wheels 15 and a rear pair of wheels 16, the front pair of wheels 15 being carried on a front axle 18 and the rear pair of wheels 16 being carried on a rear axle 19.

Both pairs of wheels 15, 16 in this example are driven wheels, being driven by their respective axles 18, 19 from respective transmission members (not seen) of a mechanical machine transmission T to which drive is provided from the engine 13. All four wheels 15, 16 are braked by a braking system 5 which is shown schematically in FIG. 2.

The body 11 of the loading machine 10 mounts the engine 13 at or towards a rear end thereof The body 11 also includes at or towards the rear end thereof, a tower mounting structure 22 which includes a pair of plates between which is mounted a telescopic or otherwise extendible loading arm 25. The loading arm 25 is mounted by mounting structure 22 of the body 11, at an inboard end, for pivotal up and down movement about a first generally horizontal axis A, under the control of one or more hydraulically powered lifting actuators 30.

The loading arm 25 extends forwardly from its mounting 22, beyond a front end of the body 11 to an outermost end, where the loading arm 25 has a mounting 34 for a loading implement 32, which in this example is a loading device i.e. a pair of forks 35, carried on a carriage 28.

The loading implement 32 is pivotal relative to the loading arm 25 about a second generally horizontal axis B, by a hydraulically operated actuator (not shown).

The first horizontal axis A about which the loading arm 25 is moveable, is in this example, provided at a relatively high position, in a generally horizontal plane P which contains or is spaced above or at least close to an upper level of an operator's cab 9 where controls for operating the loading arm 25, and for driving the machine 10 over the ground, are located.

To aid stability when the machine 10 is performing loading operations, the body 11 includes, at the rear end, a counterweight 33 at a low position, which counterweight 33 extends rearwardly of the body 11 beyond the horizontal axis A about which the loading arm 25 is moveable. Whereas the engine 13 could in another example, be mounted by the body 11 at a side of the body 11 opposite to the position of the cab 9, in this example the engine 13 is mounted by the body 11 above the rear axle 19 and below a rear portion of the loading arm 25 where the arm 25 is mounted to the tower mounting structure 22, so as to provide some additional counterweighting during loading operations, and to minimise the body width. The operator's cab 9 is mounted at a side of the body 11 opposite to the loading arm 25 so that the loading arm 25 extends to the side of the cab 9.

The carriage 28 of the loading device 35 includes at least one wheel 27, but in this example a pair of wheels 27, which when the loading arm 25 is in a lowered position as shown in FIG. 1, engages the ground. Particularly where the loading arm 25 is extended to a great extent and the arm 25 is in a lowered position, where maximum machine 10 overturning forces are experienced, the provision of the at least one wheel 27 on the carriage 28 enables the counterweight 33 to be reduced, enabling the machine 10 to be made lighter than otherwise, thereby enabling the machine 10 to travel faster than a comparable machine without this wheel 27 feature.

The loading arm 25 is extendible by the operation of a telescoping hydraulic actuator 12 which in this example is mounted exteriorly of the loading arm 25 along a top thereof but in another example may be mounted internally of the loading arm 25 as required. The loading arm 25 in the example is a two or three stage telescoping arm 25. The machine 10 is intended for relatively low level loading work as described below. In another example a three or more stage loading arm 25 could instead be provided where greater height reach is required.

The loading machine 10 is intended for relatively low level loading at a work location. For example, the machine 10 may handle standard size shipping containers to load and unload them onto the backs of lorries for example Thus the load is not intended to be lifted to great heights e.g. by fully extending the loading arm 25, but this extension is required to enable loads to be withdrawn from and placed inside containers for examples. By providing the carriage 28 with a ground engaging wheel 27, the load carried by the lifting forks 35 may be supported on the ground at least when the arm 25 is at maximum reach, whilst the arm 25 is retracted to a length at which the counterweight 33 (and engine 13 weight) can counterbalance the load while it is lifted.

In the example, there is provided a double acting hydraulic actuator 31 between the loading arm 25 and the body 11 from each side of which fluid is displaceable depending upon whether the loading arm 25 is raised or lowered, which displaced fluid is fed to the hydraulic actuator which is provided to tilt the loading implement 32 about axis B, to maintain the attitude of the loading forks 35 during lifting and lowering.

Alternatively, self-levelling of the loading implement 32 may be achieved by other means.

The loading machine 10 is capable of high speed travel, for example well in excess of 30 km per hour.

To enable this, and referring now particularly to figure 1a, it can be seen that the rear axle 19 carrying the pair of rear wheels 16, is suspended from the body 11 of the machine 10, in this case by a non-reactive suspension.

At each side of the machine 10, the rear axle 19 is pivotally connected to a pair of links 100, 101, one of which i.e. the link indicated at 100, being above the other 101 relative to the ground, the links 100, 101 of each pair being pivotally connected at their one ends 100a; 101a relative to the body 11 and at their other ends 100b; 101b to the rear axle 19.

Damping struts 105, one at each side of the body 11, are provided to damp axle 19 movements, between the axle 19 and the body 11, the struts in this example being hydraulic devices (e.g. pistons within cylinders), with gas springs 106, but other damping strut arrangements are possible.

In FIG. 1a it can be seen that the links 100, 101 are leading links, i.e. they extend forwardly from the rear axle 19, but in another construction may be trailing links.

The front axle 18 is suspended from the body 11 by a non-reactive suspension substantially similar to that shown in FIG. 1a although the pivoted links 100, 101 at each side of the body 11, are preferably trailing links.

Although it is preferred for each of the front and rear axles 18, 19 to be suspended from the body 11 by a non-reactive suspension as described, other suspension arrangements are possible.

Pressurised hydraulic fluid for powering the various hydraulic actuators 30 of the loading arm 25 and loading device 32 is provided by a hydraulic pump 36 (see FIG. 2) driven directly from the engine 13, the pump 36 pumping fluid from a reservoir 37 to a hydraulic system, fluid flow to the various actuators 30 being controlled by one or more hydraulic control valves 40 which may be manually or electrically operated as required. Thus a supply of pressurised hydraulic fluid is always available while the engine 13 is running.

The loading machine 10 further includes an air compressor 45 which may be driven from for example, an engine turbocharger, or otherwise from the engine 13 or from a motor. The air compressor 45 pressurises air in a pressurised air system 46, and particularly charges a reservoir 48, the pressurised air being usable as hereinafter described, by the braking system 5 for applying service brakes of the machine 10.

The pressurised air is delivered to an air valve 49 which is actuated by a brake pedal 50 which is located in the operator's cab 9. The proportion of air which is permitted to pass the valve 49 depends upon the extent to which the foot pedal 50 is depressed and thus the air pressure downstream of the valve 49 is representative of a brake demand. The further the pedal 50 is depressed, up to its full extent of depression when substantially all the air delivered to the air valve 40 may pass therethrough to apply full braking pressure, the more pressurised air is provided to air-hydraulic actuators, one of which is indicated at 55, for applying service brakes.

The ground engaging structure provides for each wheel 15, 16 in this example, a braking device 56 for applying braking to the wheel 15, 16, each braking device 56 being operated to apply the brake by hydraulic fluid pressurised by an air-hydraulic actuator 55. Each air-hydraulic actuator 55 may be operative to supply pressurised hydraulic fluid to one or a plurality of the braking devices 56.

In this example, each braking device 56 is a pad and disc type device including a rotatable member namely a disc 57, which rotates with the associated wheel 15, 16, and a braking member, i.e. a pad 58 (or pads) which is/are moveable into frictional engagement with the rotating disc 57 to effect braking, by hydraulic fluid acting for example through a "slave" piston and cylinder arrangement.

The air-hydraulic actuator 55 pressurises hydraulic fluid from a brake fluid reservoir 62, by means of an air powered servo 61 mechanism such that the hydraulic fluid pressure developed, and accordingly the extent of braking, depends upon the air pressure delivered from the pedal operated air valve 49 Thus the further an operator depresses the brake pedal 50, the greater the braking force applied by the braking device 56 to its associated wheel 15, 16, to match the brake demand.

The service brakes 56 preferably are released by mechanical springs when air pressure is no longer supplied to the air-hydraulic actuators 55, i.e. when the brake pedal 50 is released. The foot pedal 50 too may be returned to its uppermost, unbraking position, by a mechanical spring, although in each case some other brake return/pedal release mechanism may be provided as required.

In accordance with the present invention, the braking system 5 for the machine 10 further includes a brake control system including a controller 110 which provides a brake anti-locking function to resist any braked wheel 15, 16 skidding relative to the ground as a result of becoming locked during braking when a low friction condition exists between the wheel 15, 16 and the ground.

Figure 2:
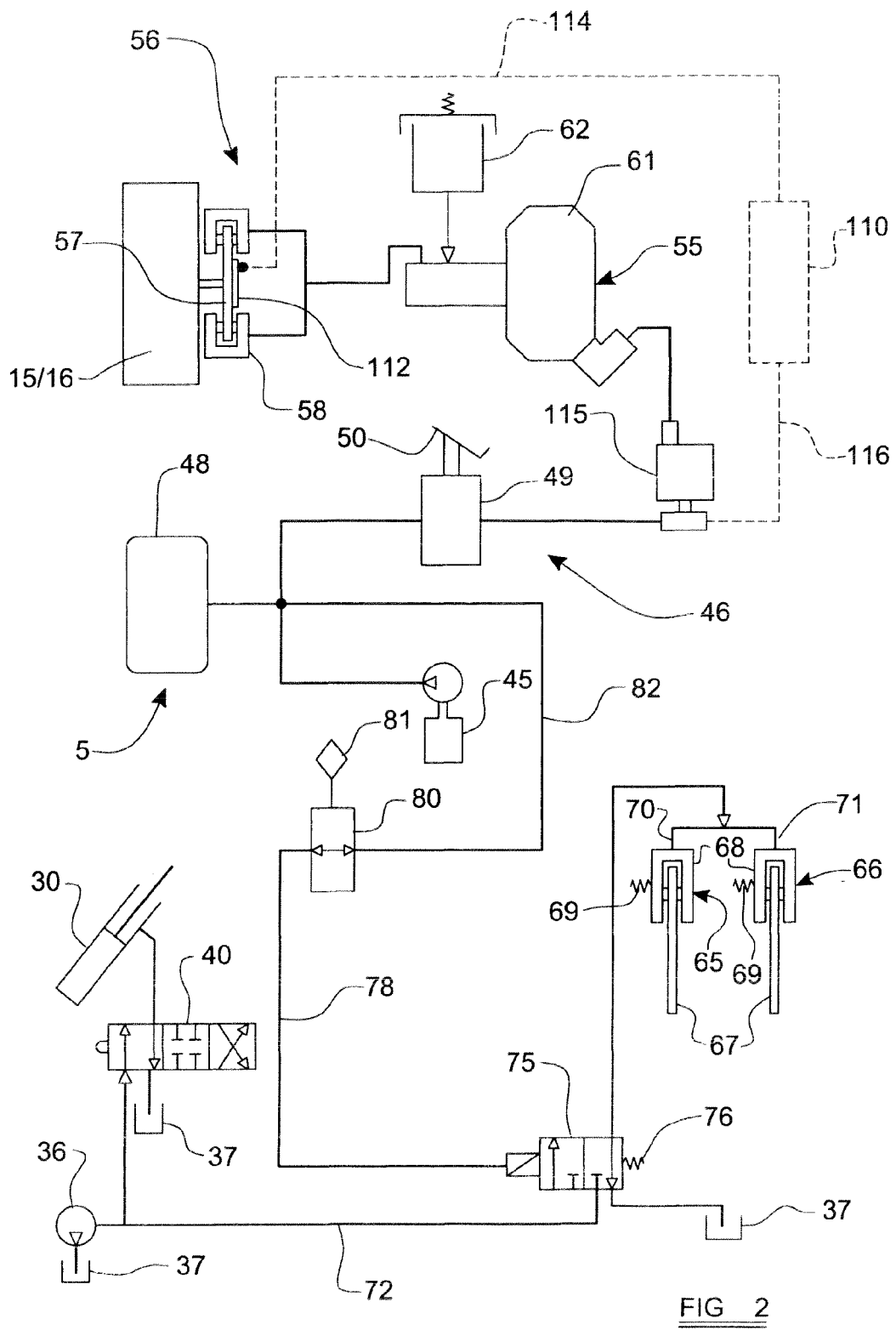
FIG. 2 is a schematic diagram of a braking system of the machine of FIG. 1.

Thus the braking system 5 includes, for each braking device 56, a wheel speed sensor 112 to sense the rotational speed of each of the wheels 15, 16 and to provide an electrical signal input to the controller 1 10 along a line, one of which for the one wheel shown in FIG. 2, is indicated at 114.

Typically the wheel speed sensor 112 includes an annulus of teeth which rotate with the wheel 15, 16 e.g. with the rotatable brake disc 57, and an optical sensing device mounted with respect to a wheel hub, for sensing the teeth as they move past the device as the wheel, and hence as the annulus, rotates. The construction of such a wheel speed sensor 112 is well known and further description is considered unnecessary.

The controller 110 is configured to determine from the electrical signal inputs from the wheel speed sensors 112 of all or at least some of the wheels 15, 16, when the brakes are applied, whether any wheel is skidding, or is about to skid, relative to the ground as a result of becoming locked during braking when a low friction condition exists between the ground and the wheel.

This may be achieved by the controller 110 using an algorithm which compares wheel 15, 16 speeds as sensed, and makes calculations as is well known in the art of anti-lock braking technology.

In the event that a skidding or potential skidding condition is determined, the controller 110 is operative to modulate the hydraulic fluid pressure provided by the air-hydraulic actuator 55 which provides hydraulic fluid pressure to apply braking, to at least the skidding wheel 15, 16. Preferably though, such modulated hydraulic fluid pressure is supplied at least to both the wheels 15 or 16 on the axle 18, 19 on which a skidding or potentially skidding wheel is sensed, and more preferably, to all four wheels 15, 16 in the event that any one wheel 15, 16 is determined to be skidding or about to skid.

Typically, the controller 110 may modulate the hydraulic pressure provided to apply braking by cycling the hydraulic fluid pressure provided by the air-hydraulic actuator 55 or actuators, between a pressure reduction phase and a pressure increase phase although a cycle may also include a pressure hold phase between the pressure reduction and the pressure increase phases. In each case, by cycling releasing and applying the braking force applied to a wheel, steerability of the machine 10, even at high speeds may be maintained during braking without risk of loss of control.

Such modulation of the hydraulic fluid pressure is preferably achieved by modulating the brake demand pressurised air signal which is delivered from the foot pedal 50 valve 49. Thus the braking system 5 may include a single one, or possibly a plurality of modulating air pressure valves 115, which in accordance with an electrical control signal which passes along a line 116 from the controller 110 to the modulating air pressure valve 115, modulates the demand signal from the foot brake 50 valve 49, which is applied to the air-hydraulic actuator or actuators 55.

Where only a single modulating air pressure valve 115 is provided, this would vary the brake demand signal for all four wheels 15, 16, but where a plurality of such modulating air pressure valves 115 are provided, for example with each air pressure modulating valve 115 serving only one or two of the air-hydraulic actuators 55 for one or two of the braking devices 56 for one or two of the wheels 15, 16, this would permit the controller 110 to modulate the brake demand signal differently for e.g. for the front and the rear wheels 15, 16, if required.

In each case, the brake demand signal is only modulated to modulate the hydraulic fluid pressure applied to the braking device 56 or devices, when a skidding condition or potential skidding condition, is determined.

The machine 10 further includes a transmission brake for applying primarily when the machine 10 is parked, and particularly when no supply of pressurised air for the service brakes 56, may be available.

In this example, the machine 10 is four wheel driven and accordingly to achieve adequate transmission braking, two such transmission brakes, indicated at 65, 66 are provided.

Each transmission brake 65, 66 in this example, includes a disc 67 each of which is carried by a respective transmission member for the rear wheel 16 drive, and for the front wheel 15 drive. Also there is provided for frictionally engaging each disc 67, a pad, or pads 68 in this example. The pads 68 are urged towards and into engagement with their respective discs 67, by mechanical springs 69, and hence in their rest conditions, the transmission brakes are applied to brake the discs 67 and hence the transmission members.

However the transmission brakes 65, 66 are releasable by the application of pressurised hydraulic fluid to pressurised hydraulic fluid brake releasing devices 70, 71. By virtue of the transmission brake releasing devices 70, 71 being hydraulically releasable, notwithstanding that the springs 69 applying the brakes will be very strong springs in order to generate sufficient braking force to apply the transmission members 22, 23 adequately, the brake releasing devices 70, 71 may be made much smaller than comparable air operated units.

The pressurised hydraulic fluid for releasing the transmission brakes 65, 66 is derived from the hydraulic circuit of the machine 10, via a fluid feed line indicated at 72, the hydraulic fluid passing though a transmission brake control valve 75. The transmission brake control valve 75 is biased by a spring 76 towards a first operative condition as indicated in FIG. 2, in which the hydraulically operated brake releasing devices 70, 71 are each connected through the transmission brake control valve 75 to the reservoir 37 or another low pressure area, and so the devices 70, 71 will not act to release the transmission brakes 65, 66 which thus will be applied by the springs 69. In a second operative condition to which the valve 75 is moveable against the spring 76, pressurised hydraulic fluid from the supply line 72 may pass to the hydraulically operated brake releasing devices 70, 71 to release the brakes. 65, 66.

The transmission brake control valve 75 is moved to its second operative condition when the transmission brakes 65, 66 are released only when pressurised air is provided to the valve 75 along an air supply line indicated at 78, in response to operation of an operator transmission brake control valve 80 from within the cab 9. Desirably the transmission brake control valve 80 is hand operated by an operator actuating a brake release lever 81.

In this example, pressurised air for releasing the transmission brakes 65, 66 is derived from the air system 46 provided for applying the service brakes 56. Thus pressurised air may be delivered from the air system 46 along a line 82 to the transmission brake control valve 80.

It will be appreciated that in the event of a failure in the air system, or when the pressure in the air system 46 deliberately is released, e.g. when it desired to park the machine 10 for long periods, no pressurised air will be available to move the transmission brake control valve 75 against its spring 76 to its second operative condition and thus the transmission brakes 65, 66 will remain or be applied. This provides for a fail safe feature in that braking from the transmission brakes 65, 66 will always be available.

Similarly in the event of any failure of the hydraulic pump 36, there will be no pressurised hydraulic fluid available actually to release the transmission brakes 65, 66. Thus the use of the pressurised air actuated transmission brake control valve 75 results in the transmission brakes 65, 66 being applied in the event of either of both air system 50 or hydraulic pressure failures.

In another example the transmission brakes 65, 66 need not be of the disc and pad type, but the invention may be applied to another kind of friction brake, such as drum and calliper, where the transmission member may carry a drum, or further alternatively, the transmission brake or brakes 65, 66 may each be a multi-interleaved plate type brake.

Pressurised air for actuating the transmission brake control valve 75 may be derived from other than the service brake air system 46, for example from a dedicated air source.

Pressurised hydraulic fluid for releasing the transmission brake control valve 75 may be derived from other than the hydraulic system of the machine 10 which includes actuator 30 and control valve 40 for operating the loading arm 25 of the machine, for example from a dedicated pressurised hydraulic fluid supply.

The transmission brake or brakes 65, 66 may be applied by hydraulic fluid pressure, as well as released by hydraulic fluid pressure by operation of the air actuated transmission brake control valve 75.

Various other modifications are possible without departing from the scope of the present invention.

The invention claimed is:

1. A wheeled loading machine including a body mounting a loading arm, a ground engaging structure including a front axle which carries a front pair of ground engaging wheels and a rear axle which carries a rear pair of ground engaging wheels, the loading arm being mounted at a position towards a rear of the machine for up and down movement about a generally horizontal axis, and the loading arm extending forwardly beside a cab which is mounted at one side of the body, to an outermost end which is beyond a front of the body, and the loading arm having at its outermost end a mounting for a loading implement and the arm being extendible to vary the length of the loading arm, and each axle being suspended from the body by a respective suspension, each of the ground engaging wheels being drivable by an engine of the machine through a mechanical transmission, and the machine including a braking system for braking each wheel, the braking system including a brake control system which provides a brake anti-locking function to resist any braked ground engaging wheel skidding relative to the ground as a result of becoming locked during braking when a low friction condition exists between the wheel and the ground.

2. A machine according to claim 1 wherein the suspension suspending each of the front and rear axles is non-reactive in that the vertical load on the respective wheels carried by the axle and hence the traction between the wheels and the ground, does not significantly vary in response to changes in the driving torque applied to the wheels through the transmission.

3. A machine according to claim 2 wherein the suspension includes for at least one of the front and rear axles at each side of the machine, a pair of links, one link of each pair being above the other relative to the ground, the links each pair being pivotally connected at their one ends to relative to the body and at their other ends to the respective axle.

4. A machine according to claim 3 wherein the suspension includes for the at least one axle, damping struts to damp axle movements, provided between the axle and the body.

5. A machine according to claim 1 wherein the braking system includes for each wheel, a braking device is operated by hydraulic fluid pressure, pressurised by an air-hydraulic actuator.

6. A machine according to claim 5 wherein the brake control system includes for each wheel, a wheel speed sensor, the brake control system also including a controller responsive to wheel speed signals from each of the wheel speed sensors, and operative to determine whether any braked wheel is skidding relative to the ground as a result of becoming locked during braking, and in the event that a skidding condition is determined, the controller modulating the hydraulic fluid pressure provided to apply braking to at least the skidding wheel.

7. A machine according to claim 6 wherein the controller modulates the hydraulic pressure provided to apply braking by cycling the pressure between a pressure reduction phase and a pressure increase phase.

8. A machine according to claim 7 wherein the cycle includes a pressure hold phase between the pressure reduction and the pressure increase phases.

9. A machine according to claim 7 wherein the controller modulates the hydraulic fluid pressure provided to apply braking to both wheels of the front and/or the rear axle where any or both wheels are determined to be skidding relative to the ground during braking as a result of becoming locked.

10. A machine according to claim 7 wherein the hydraulic fluid pressure Is modulated by modulating air pressure supplied to the air-hydraulic actuator.

11. A machine according to claim 1 wherein the body includes at the rear end, a counterweight at a low position which extends rearwardly of the body beyond the horizontal axis about which the loading arm is moveable.

12. A machine according to claim 1, wherein the horizontal axis about which the loading arm is moveable is located in a horizontal plane which contains or is spaced above an upper end of the operator's cab.

13. A machine according to claim 12 wherein the engine is mounted by the body above the rear axle and below a rear portion of the loading arm.

14. A machine according to claim 1, which includes a loading implement mounted at the outermost end of the loading arm, the loading implement being a loading device provided on a carriage which is mounted to the loading arm mounting, and the carriage including at least one wheel, which when the loading arm is in a lowered position, engages the ground.

15. A wheeled loading machine including a body mounting a loading arm, a ground engaging structure including a front axle which carries a front pair of ground engaging wheels and a rear axle which carries a rear pair of ground engaging wheels, the loading arm being mounted at a position at a rear of the machine for up and down movement about a generally horizontal axis which is located in a horizontal plane which contains or is spaced above an upper end of the operator's cab, and the loading arm extending forwardly beside a cab which is mounted at one side of the body, to an outermost end which is beyond a front of the body, and the loading arm having at its outermost end a mounting for a loading implement and the arm being extendible to vary the length of the loading arm, and each axle being suspended from the body by a respective suspension, each of the ground engaging wheels being drivable by an engine of the machine through a mechanical transmission, the engine being mounted by the body above the rear axle and below a rear portion of the loading arm, and the machine including a braking system for braking each wheel, the braking system including a brake control system which provides a brake anti-locking function to resist any braked ground engaging wheel skidding relative to the ground as a result of becoming locked during braking when a low friction condition exists between the wheel and the ground.

16. A machine according to claim 15 wherein the body includes, at the rear end, a counterweight at a low position which extends rearwardly of the body beyond the horizontal axis about which the loading arm is moveable.

17. A machine according to claim 15, which includes a loading implement mounted at the outermost end of the loading arm, the loading implement being a loading device provided on a carriage which is mounted to the loading arm mounting, and the carriage including at least one wheel, which when the loading arm is in a lowered position, engages the ground.

18. A wheeled loading machine including a body mounting a loading arm, a ground engaging structure including a front axle which carries a front pair of ground engaging wheels and a rear axle which carries a rear pair of ground engaging wheels, the loading arm being mounted at a position towards a rear of the machine for up and down movement about a generally horizontal axis, and the loading arm extending forwardly beside a cab which is mounted at one side of the body, to an outermost end which is beyond a front of the body, and the loading arm having at its outermost end a mounting for a loading implement and the arm being extendible to vary the length of the loading arm, a loading implement mounted at the outermost end of the loading arm, the loading implement being a loading device provided on a carriage which is mounted to the loading arm mounting, and the carriage including at least one wheel, which when the loading arm is in a lowered position, engages the ground, and each axle being suspended from the body by a respective suspension, each of the ground engaging wheels being drivable by an engine of the machine through a mechanical transmission, and the machine including a braking system for braking each wheel, the braking system including a brake control system which provides a brake anti-locking function to resist any braked ground engaging wheel skidding relative to the ground as a result of becoming locked during braking when a low friction condition exists between the wheel and the ground.

19. A wheeled loading machine including a body mounting a loading arm, a ground engaging structure including a front axle which carries a front pair of ground engaging wheels and a rear axle which carries a rear pair of ground engaging wheels, the loading arm being mounted at a position towards at a rear of the machine for up and down movement about a generally horizontal axis which is located in a horizontal plane which contains or is spaced above an upper end of the operator's cab, and the loading arm extending forwardly beside a cab which is mounted at one side of the body, to an outermost end which is beyond a front of the body, and the loading arm having at its outermost end a mounting for a loading implement and the arm being extendible to vary the length of the loading arm, a loading implement mounted at the outermost end of the loading arm, the loading implement being a loading device provided on a carriage which is mounted to the loading arm mounting, and the carriage including at least one wheel, which when the loading arm is in a lowered position, engages the ground, and each axle being suspended from the body by a respective suspension, each of the ground engaging wheels being drivable by an engine of the machine through a mechanical transmission, the engine being mounted by the body above the rear axle and below a rear portion of the loading arm, and the machine including a braking system for braking each wheel, the braking system including a brake control system which provides a brake anti-locking function to resist any braked ground engaging wheel skidding relative to the ground as a result of becoming locked during braking when a low friction condition exists between the wheel and the ground.

* * * * *